(12) United States Patent
Chakhmatov et al.

(10) Patent No.: US 11,809,437 B1
(45) Date of Patent: *Nov. 7, 2023

(54) SYSTEM AND METHOD FOR PROVIDING INFORMATION ABOUT USERS WHO PERFORMED INTERNET-BASED ACTIVITIES

(71) Applicant: Zoosk, Inc., Berlin (DE)

(72) Inventors: Anton Chakhmatov, Alameda, CA (US); Shayan G. Zadeh, San Francisco, CA (US); Eric R. Barnett, Menlo Park, CA (US); Alexander F. Mehr, San Juan, PR (US)

(73) Assignee: Zoosk, Inc., Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/811,993

(22) Filed: Jul. 12, 2022

Related U.S. Application Data

(63) Continuation of application No. 17/093,555, filed on Nov. 9, 2020, now Pat. No. 11,386,098, which is a continuation of application No. 14/919,684, filed on Oct. 21, 2015, now Pat. No. 10,831,765.

(60) Provisional application No. 62/066,775, filed on Oct. 21, 2014.

(51) Int. Cl.
| | |
|---|---|
| *H04L 67/02* | (2022.01) |
| *G06F 16/22* | (2019.01) |
| *G06F 16/2457* | (2019.01) |
| *H04L 67/50* | (2022.01) |

(52) U.S. Cl.
CPC ........ *G06F 16/24578* (2019.01); *G06F 16/22* (2019.01); *H04L 67/02* (2013.01); *H04L 67/535* (2022.05)

(58) Field of Classification Search
CPC ..... H04L 67/22; H04L 67/02; G06F 17/3053; G06F 16/24578; G06F 16/22
USPC .......................................................... 707/748
See application file for complete search history.

(56) References Cited

U.S. PATENT DOCUMENTS

| | | | | |
|---|---|---|---|---|
| 2002/0004764 | A1* | 1/2002 | Stolze | G06Q 30/02 |
| | | | | 705/26.8 |
| 2004/0210661 | A1* | 10/2004 | Thompson | G06Q 30/02 |
| | | | | 709/228 |
| 2006/0026232 | A1* | 2/2006 | Malik | H04L 51/36 |
| | | | | 709/204 |
| 2006/0229896 | A1* | 10/2006 | Rosen | G06Q 10/1053 |
| | | | | 705/321 |
| 2006/0229902 | A1* | 10/2006 | McGovern | G06Q 50/10 |
| | | | | 705/321 |
| 2007/0038659 | A1* | 2/2007 | Datar | G06Q 30/02 |
| 2011/0010641 | A1* | 1/2011 | Wolff | H04L 12/1813 |
| | | | | 715/753 |
| 2011/0231240 | A1* | 9/2011 | Schoen | H04L 51/32 |
| | | | | 705/14.41 |
| 2012/0136877 | A1* | 5/2012 | Zadeh | G06Q 10/06311 |
| | | | | 707/749 |

(Continued)

*Primary Examiner* — Robert W Beausoliel, Jr.
*Assistant Examiner* — Pedro J Santos
(74) *Attorney, Agent, or Firm* — Innovation Partners LLC; Charles E. Gotlieb

(57) ABSTRACT

A system and method provides information to a user about other users who have shown an interest in the user or in whom the user shows an interest, or other users in whom the user has shown disinterest or other users who have shown disinterest in the user, as indicated by actions performed with respect to a website or other Internet-accessible repository of data.

18 Claims, 6 Drawing Sheets

(56) References Cited

U.S. PATENT DOCUMENTS

2014/0289261 A1* 9/2014 Shivakumar .......... G06Q 50/01
707/748

* cited by examiner

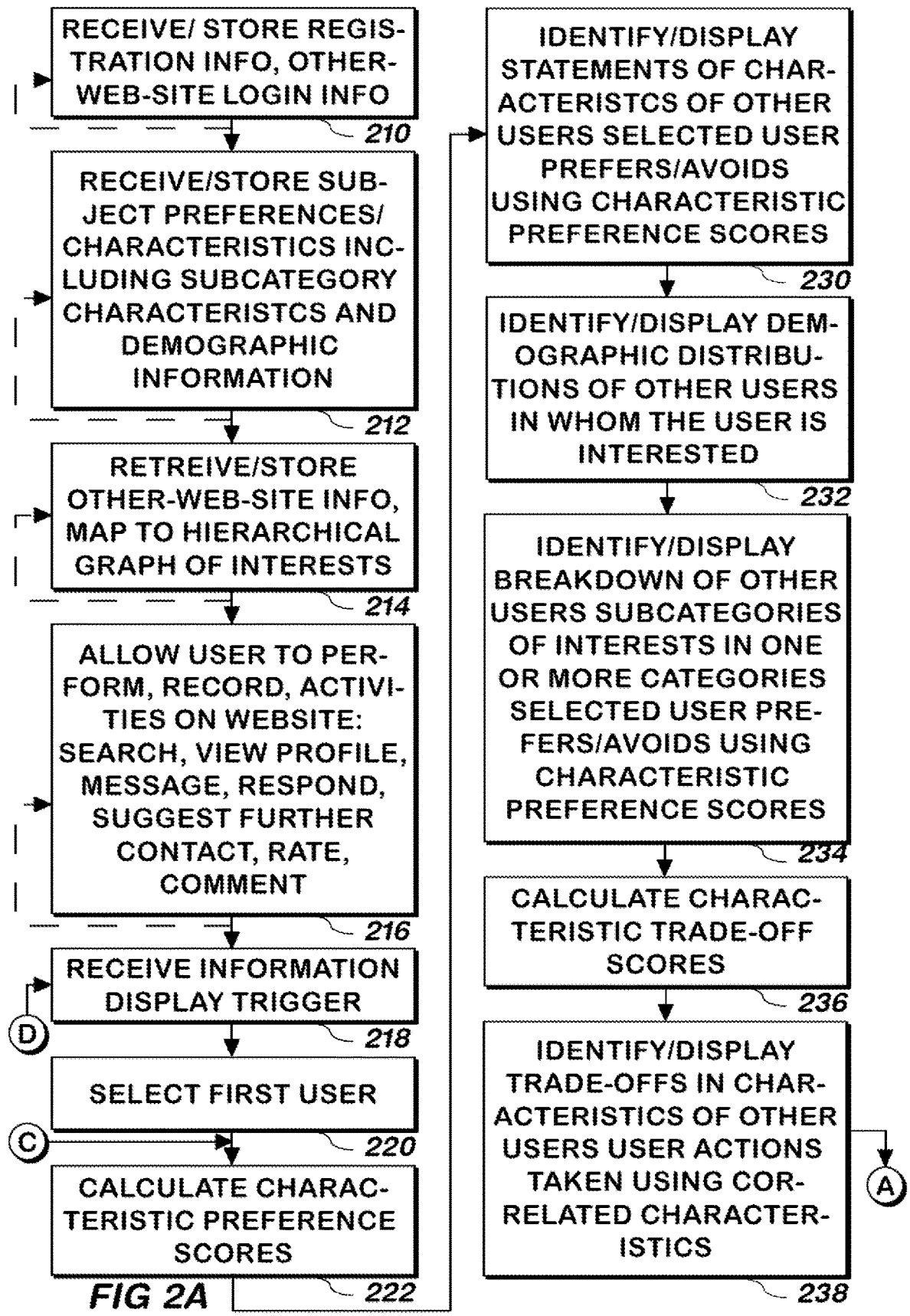

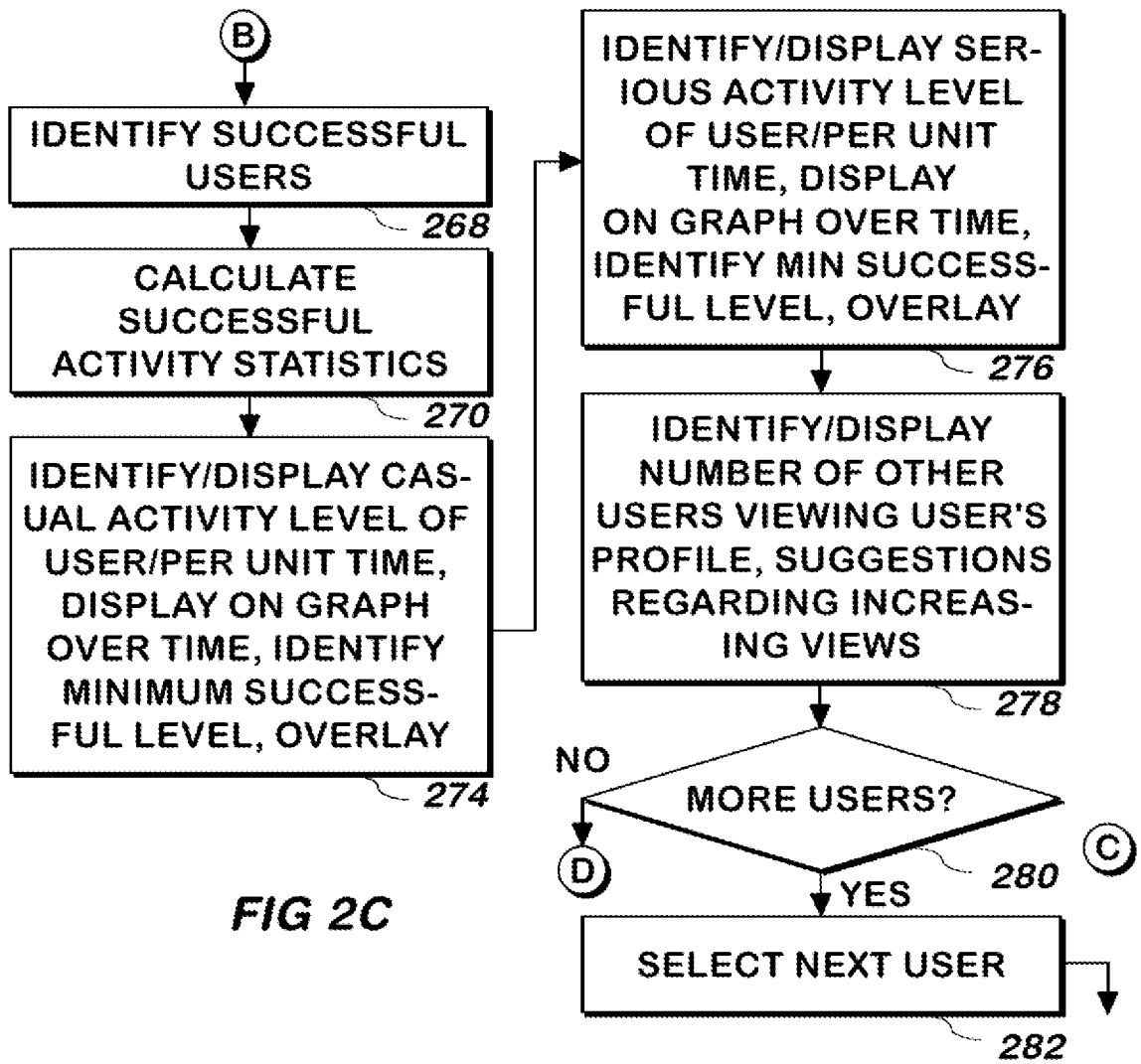

SYSTEM AND METHOD FOR PROVIDING INFORMATION ABOUT USERS WHO PERFORMED INTERNET-BASED ACTIVITIES

RELATED APPLICATIONS

This application is a continuation of U.S. patent application Ser. No. 17/093,555 entitled, "System and Method for Providing Information About Users Who Performed Internet-Based Activities" filed on Nov. 9, 2020 by Alexander Mehr, Shayan G. Zadeh, Eric R. Barnett and Anton Chakhmatov, which is a continuation of U.S. patent application Ser. No. 14/919,684 entitled, "System and Method for Providing Information About Users Who Performed Internet-Based Activities" filed on Oct. 21, 2015 by Alexander Mehr, Shayan G. Zadeh, Eric R. Barnett and Anton Chakhmatov, which claims the benefit of U.S. Provisional Patent Application Ser. No. 62/066,775 entitled, "Method and Apparatus for Providing Information About Users Who Performed Internet-Based Activities" filed by Alexander F. Mehr, Shayan G. Zadeh, Eric R. Barnett and Anton Chakhmatov on Oct. 21, 2014, and is related to the subject of U.S. patent application Ser. No. 13/200,229 entitled, "System and Method for Selecting Compatible Users for Activities Based on Experiences, Interests or Preferences Identified from One or More Web Services" filed on Sep. 21, 2011 by Shayan Zadeh and Alexander Mehr, and each such application is incorporated by reference in its entirety.

FIELD OF THE INVENTION

The present invention is related to computer software and more specifically to computer software for providing information using a user's activities on a web site.

BACKGROUND OF THE INVENTION

Users of web sites may be able to perform activities on the web site. This arrangement is suboptimal. What is needed is a system and method for providing information about their activities and the activities of other users towards them on as web site.

SUMMARY OF INVENTION

A system and method allows a user to provide characteristics of that user as well as other information, records users' activities on a primary web site and collects information about interests, preferences and activities from one or more other web sites such as social network web sites for each of several users. The activities of a user may be directed towards another user of the web site. The system and method provides information about other users or items to which the user's activities on the web site were, or were not, directed, information about the other users who are interested in the user or items of the user, information about the user's activity level on the primary web site and a comparison with an activity level considered successful, and information about other users' activities with respect to the user, as well as suggestions for increasing such activity levels. Information may be provided in the form of conventional statistical presentations such as charts or graphs, or statements that are sentences that summarize some or more aspects of the statistics or other information described herein.

Information about other users or items to which the user's activities on the web site were, or were not, directed may include demographic information about such other users or items, information about subcategories of characteristics of such other users or items, personality traits and trade-offs the user makes with respect to characteristics of other users or items. Characteristics of a user may include features of the user such as demographic information, as well as interests, preferences and activities of the user other than preferences for an item or other user of the primary web site. Items may include goods and/or services. Subject preferences may include preferences of users or items in which the other user is interested. Some characteristics may be described in the form of subcategories of a category, as described in more detail below.

Information about the other users who are interested in the user or items of the user, may include information about characteristics of such other users including demographic information, statistical distributions across each of one or more characteristics of the other users, personality traits of such other users, and information about preferences, interests, and experiences that the other users have or that the user has in common with other users in which the user expressed an interest via activities performed on the primary web site, or other users who expressed an interest in the user.

Information about the user's activity level on the primary web site may include an amount of one or more activities, including "casual activities," such as review of information of other users or items, and "serious activities," such as initiations and/or responses of messages sent to other users. Information about other users' activities on the primary web site with respect to the user or the user's items may include the number of other users who viewed a set of profile information about the user or the user's items.

The information may be provided to the user occasionally or as requested by the user.

The same or similar information may be provided about other users in which the user tends to show little or no interest or other users who show little or no interest in the user, when the user is presented with information about or messages from such other users or vice versa.

DETAILED DESCRIPTION OF A PREFERRED EMBODIMENT

Figure 1:
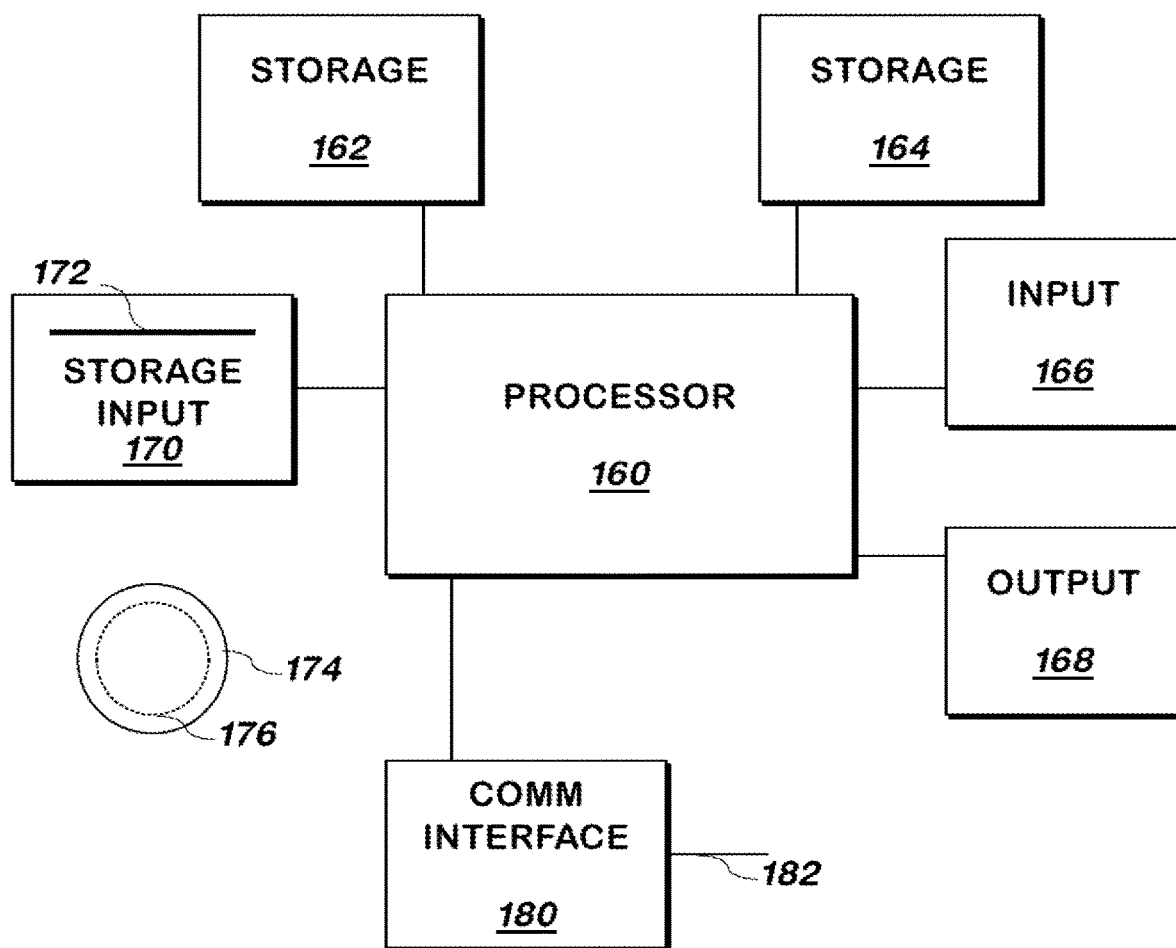
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2B:
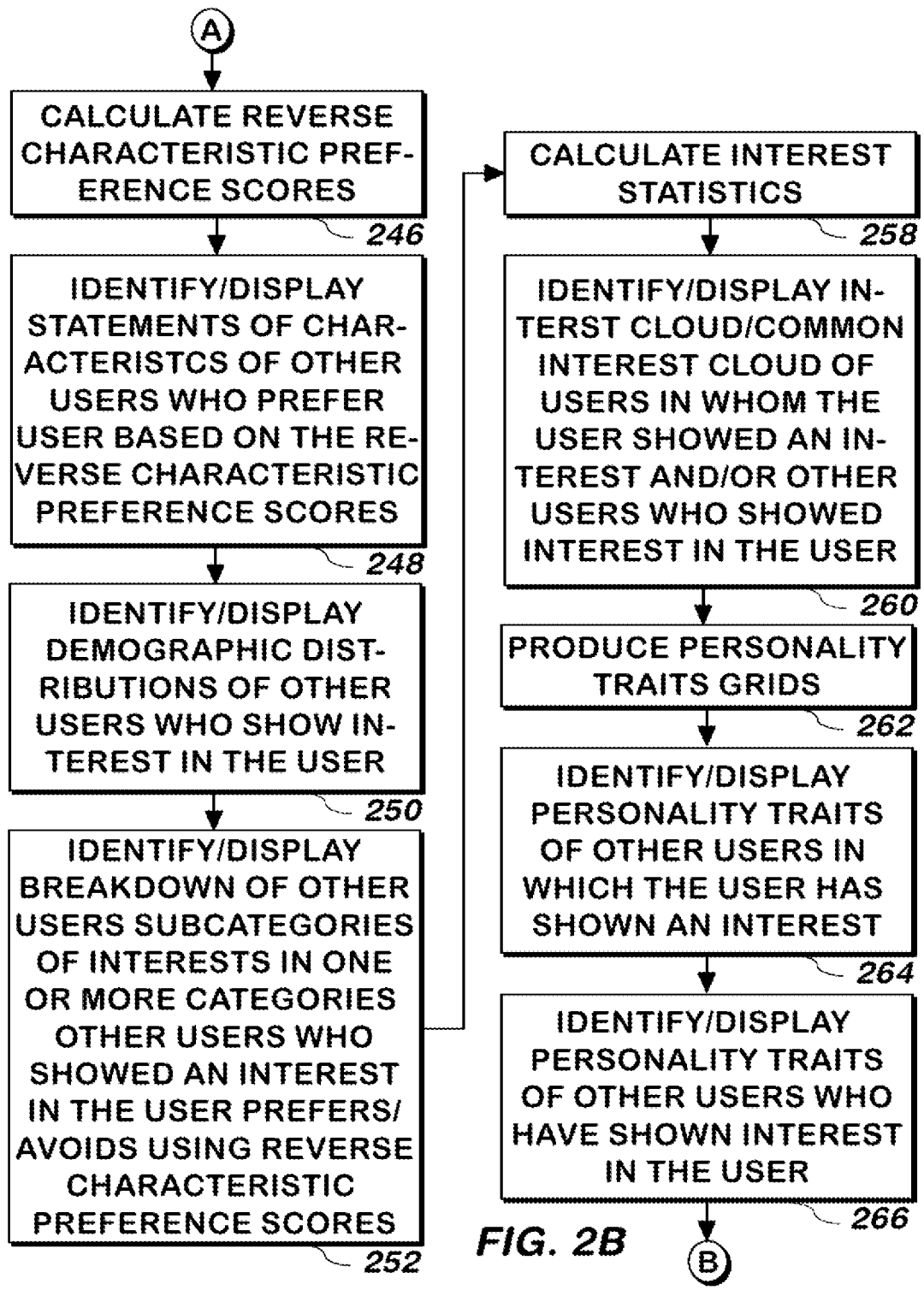
FIG. 2, consisting of FIG. 2A, FIG. 2B.
FIG. 2C is a flowchart illustrating a method of providing information about users' activities on a web site according to one embodiment of the present invention.

Referring now to FIG. 2, consisting of FIGS. 2A, 2B and 2C, a method of providing information about other users corresponding to a user's activities on a website and information about other users who perform activities on a website that involve the user, for each of multiple users, is shown according to one embodiment of the present invention.

As used herein, a "website" or "web site" is a repository of data accessed by multiple users via one or more networks, such as the Internet. A web site may be accessed via a conventional smart device, such as a cell phone or a tablet, via an application or a browser. The manner in which the data is accessed (e.g. app via browser) does not affect whether a repository of data accessed by multiple users is a web site. Activities performed on a web site are those that involve the repository, and may be performed via a browser, an application or other means of accessing the data in the repository.

The website may be one in which a user can search for other users or items, and see one or more pages of search results with summary information about the other users. The user may click on the summary information for one of the other users or an item offered by the other user, and see a profile containing more detailed information about such other user or item. The user may then message the other user and the other user may respond to such message.

Further responses may be made to each message received and the content of the message may indicate that the user is being requested or confirming an activity that would indicate that the users have achieved a successful purpose of the web site. Such purpose may be to arrange a date, or show an item for sale, for example. The web site that implements these functions and the information display functions described herein is referred to as the "primary web site".

Receive/Store Registration Information, Other-Web-Site Login Information for Each User.

Registration information and other-web-site login information is received and stored for each user 210. In one embodiment, registration information includes a username and password that is received from each user in a conventional fashion. Other-web-site login information may include the identifier of the web site and the user's user identifier and/or password at that web site, which may include one or more social networks or other websites that have obtained information about a user's interests and/or preferences. In one embodiment, the other-web-site login information may be received by the social network or other web site along with the user's user identifier at the primary web site, and the other web site links the user identifier of the user at the primary web site to the account of the user corresponding to the login information, and grants permission to primary web site to retrieve information from that other web site using that user identifier as described herein.

Receive/Store Characteristic Information and Subject Preferences of Each User

Characteristics and/or subject preferences of each user may be received and stored for each user 212. In one embodiment, characteristics of the user describe features, experiences and interests and preferences of the user that do not involve other users or items that the user is trying to find via the primary web site. For example, features of a user may include the age of the user, the sex of the user, and other demographic information. Other features may include the hair color of the user, height, body style and other information that physically describes the user, as well as short or long answers to essay questions that the user may answer to provide additional information about the user or the user's items. Characteristics that are interests, experiences and preferences of the user may include types of movies the user wishes to see, types of activities the user prefers, types of food the user prefers and other similar information about the user's interests. Subject preferences of the user describe characteristics of other users or items for which the user is using the primary web site to locate, that the user prefers. For example, in a dating website, subject preferences of the user describe characteristics of other users that the user prefers to date. The system and method of the present invention are not limited to dating web sites, in one embodiment, thus, the user may offer through the primary web site any items, including services, through the primary web site.

Characteristics May be Described as Subcategories.

In one embodiment, certain characteristics may be described as subcategories of a category, and any number of such categories may be used. For example, the user may indicate an interest in movies as a characteristic, as well as indicating an interest in certain types of movies, with the types of movies being considered a subcategory of the movies category. The characteristics stored may indicate one or more categories and, for each category that has a subcategory, the subcategories selected by the user that corresponds to that user. For example, the user may select subcategories corresponding to one or more types of movies in which the user it frequently interested, and each subcategory selected is stored associated with the user who selected it. All such information may be stored associated with the user from which or for which it was received.

In one embodiment, more than one subcategory of a single category may be selected by a single user, and so a characteristic, such as age range, that allows a single selection (e.g. of an age or a range of ages) is not considered to have subcategories.

Retrieve/Store Social Network and Other Information from Social Network and Other Servers.

Social network and other interest information may be retrieved from the social network or other web site accounts of each user for which other-web-site login information was provided as described herein, and such social network and other information is stored associated with the user corresponding to such social network account 214. Storage of such information may be performed by mapping the information to a hierarchically organized graph as described in the related application. In one embodiment, the information retrieved from other web sites is similar or identical to the social network information described in the related application, and such information regarding experiences, interests and preferences, may be mapped to a hierarchical graph of experiences, interests and preferences, as described in the related application.

In one embodiment, interest, preference and experience information may be received from a user directly via the primary web site as part of step 212.

Allow User to Perform Activities, Store and Timestamp Activity Information.

The user is allowed to perform activities described in the related application, such activities being conventional activities performed on a website for which the system and method of the present invention is used, and the identifier of the user, the activity performed, any parameters or other information corresponding to the activity performed (e.g. the search parameters or a pointer to content of a message), and the current date and time are stored associated with the user identifier of the user performed activity 216. In one embodiment, activities may include performing searches, viewing subsets of search results that are displayed on individual pages, viewing other users' profiles, sending a message to a user, responding to a message of the user, and sending text inside a message that indicates or requests an action to be performed external to the website, such as requesting a meeting with another user, which may be a date or a meeting to show or discuss items such as goods or services.

Steps May Operate as Independently Running Processes

As indicated by the dashed lines in the figures, each of steps 210-216 operate as an independently running process, allowing any amount of information being processed to be supplied or updated at any time, and to be processed for each of any number of users. Thus, for example, at step 212 a user may supply preferences, and then update the preferences at a later time. Additionally, other users may do the same as part of step 212.

Receive Information Display Trigger and Select First User.

An information display trigger may be received 218. The display trigger may be a timer that alerts at the end of each period, such as a week, or a display trigger may be a user request for information described below.

A first user for the trigger is selected 220. The first user may be any user who has not been selected since a threshold amount of time approximately equal to the timer period. If the information display trigger is a request by a user, the user is considered to be the first and only user for the trigger.

Identify Characteristic Preference Scores.

Characteristic preference scores are calculated for the selected user 222. To calculate the characteristic preference scores, the other users corresponding to activities the user performed are identified, and, for each potential value or potential range of values of each characteristic of such other user, a contribution (optionally weighted) is calculated, and the optionally weighted contributions are summed.

The weighted contribution may be a value of 1 for all activities, or different weighted contribution values may be used for different activities, where the weighted contribution value is higher for activities indicating a higher interest in the other user or item, and lower for activities indicating a more casual interest in the other user or item. For example, if a profile summary of another user that has a value of "brown" for the hair color characteristic appears in a user's search results, and the user clicks on the profile summary, the weighted contribution value for the "brown" value of the hair color characteristic for such activity may be 0.3, but if the user messages that other user, the weighted contribution value for the brown value of the hair color characteristic for such activity may be 0.5. A "wink", which is a low effort general expression of interest, sent to the other user may use a weighted contribution value of 0.4. A contribution value of 0.7 may be used for a reply to a message from the other user if the reply has a length above a threshold value or contains words indicating an interest (and zero or a negative value otherwise) (and a higher contribution value, such as 0.9, may be used if there are a series of messages back and forth between the user and the other user), and the "brown" contribution value of the hair color characteristic for such activity may be 1.0 if the user supplies a message to the other user with words that indicate a date or other meeting is being requested or a reply to such user indicates that a date or other meeting is being accepted. It is noted that there is one characteristic preference score for each potential value of each characteristic in one embodiment. For example, there would be another characteristic preference score for a hair color value of "black". There may be another characteristic preference score for a body type value of "athletic". A potential characteristic value is a value, or range of several values that are less than all of the potential characteristic values, that can be identified or selected by or for some or all users.

In one embodiment, for each potential characteristic value, only a single contribution value is supplied for the same activity performed with respect to the same other user, or up to a threshold number of contribution values for the same other user may be used. In one embodiment, only the highest contribution value or a threshold number of the highest values for the same other user for a single potential characteristic value is used for each other user. Thus, if the user viewed another user's profile and messaged the user, only one contribution value for that other user would be made for each characteristic value specified by that other user.

In one embodiment, if another user updates a characteristic value, the old value is also retained with applicability dates and times for both characteristic values, and the characteristic value in effect at the time of the activity is used for the contribution value.

The weighted contribution values for each potential characteristic value are summed for the activities the user performed to produce a characteristic preference score for each potential characteristic value, and the characteristic preference scores are sorted.

In one embodiment, the characteristic preference scores are obtained from characteristics supplied by the user to the primary web site, and in another embodiment, the characteristic preference scores also include information retrieved from other web sites. In such embodiment, the characteristic preference scores may also relate to interests and preferences the other user has expressed on other web sites and experiences the user reported on such other web sites.

Display Statements or Statistics Indicating Characteristics of Users the User Prefers and/or Avoids.

Statements and/or charts and/or graphs describing high or low characteristic preference scores are provided to the user for different characteristics using the characteristic preference scores 230. A statement is a sentence that incorporates the characteristic value corresponding to a high or low characteristic preference score. A statement may include "You're into people with brown hair," for a characteristic preference score for brown hair color having the highest or one of the highest values for the user among those for hair color or among all such characteristic preference scores. Another statement may be "a body type of curvy is a dealbreaker for you" for a characteristic preference score for curvy body type having the lowest or one of the lowest characteristic preference scores for the user or for one characteristic such as body styles. Statistical representations such as charts and/or graphs may also be displayed showing the distribution the user shows for potential values of a characteristic. Charts and/or graphs are described herein, but any statistical representation may be used.

Statements may be made that span multiple characteristic values, such as "You prefer people with dark hair", where dark would correspond to black or brown hair. Such statements may be made if the ratio of the characteristic preference scores for multiple characteristic values to other characteristic values for the same characteristic or set of related characteristics is higher than the average for all other users that correspond to some or all of the subject preferences received from the user, for example if the user is looking for heterosexual females between ages 20-35 within 50 miles of a zip code, the average is computed using all such other users who match such subject preferences.

Statements and/or charts and/or graphs are provided for characteristics that indicate physical characteristics of the other users or items corresponding to activities performed by the user, as well as those that indicate experiences, interests or preferences with respect to things, optionally other than the users or items in which such other users are interested (though in one embodiment, such statements and statistical representations for subject preferences may also be included). For example, one characteristic may be types of movies in which users are interested, and the potential values may include drama and historical movies, action movies and comedies. Each user may indicate which potential value they have a strongest interest or which two in which they are most interested, or the user may be asked to select movies they liked from a list, with each movie on the list correlated to the potential characteristic value (e.g. comedy) corresponding to that movie, and the user's selections may be used to identify the potential characteristic value or values in which the user has the strongest interest or interests based on the number of movies the user selects for each potential value. The characteristic preference score for each potential value as described above may be used to provide the statements regarding preferences or display of statistical representations regarding preferences.

In one embodiment, stated preferences for other users that the user would like to meet or other items the user would like to purchase or obtain are received as subject preferences from the user as part of step 212 as described above. In one embodiment, statements or statistical information such as charts and graphs may also be provided comparing the user's stated subject preferences with the other information for the user's actual activities described above. For example, a statement may be made that the user stated that they preferred men below the age of 25, but their activities have been primarily with users between the age of 25 and 30.

Provide Demographic Distribution Information Via Statements or Charts or Graphs.

Distribution information of other users in whom the user has shown an interest is provided for each of one or more characteristics 232. Distribution information shows an entire distribution of potential characteristic values of the other users across a demographic or other characteristic. For example, a pie chart or bar graph showing percentages of the highest education level attained by other users in whom the user expressed an interest, is provided.

Display Statements or Statistics Indicating Subcategories Preferred or Avoided for Other Users the User Prefers.

In one embodiment, statements or statistical representations may be provided that indicate the top threshold number or bottom threshold number of characteristics of a given subcategory within a category 234 for other users in whom the user showed an interest. For example, as described above, movies may be a category of preferences, and types of movies in which users are interested are subcategories of the movie category. Statements or charts or graphs may indicate the percentage of such other users that indicated they were most interested in a subcategory of movie for each of the top three, bottom three or all subcategories. For characteristics with subcategories, statements and/or charts or graphs regarding the top three and/or bottom three (or a number different than three) or all subcategories within each of one or more categories are displayed. Thus, statements or charts or graphs for the top three subcategories in which other users in which the user is interested are displayed to the user. In one embodiment, all subcategories are displayed in this manner, though some of the lowest represented subcategories may be merged together into an "other" subcategory. In one embodiment, some or all categories that have subcategories allow users to indicate their interest in multiple subcategories within the same category.

Characteristic Trade-Off Scores.

Characteristic trade-off scores are identified, in one embodiment, by using the contribution values for some of the characteristics 236. In one embodiment, a trade-off involves two different characteristics, though other numbers may be used. A first N by M matrix is used to hold these scores, where N is the number of potential characteristic values of the first characteristic analyzed for the trade-off and M is the number of potential characteristic values of the second characteristic analyzed for the trade-off. For each other user corresponding to an activity performed by the user, either the contribution values for all activities, highest contribution value for all activities for such other user, or a value of 1 for all activities for such other user, is added to the matrix element corresponding to the two potential characteristic values of that user or item. In one embodiment, only certain activities, such as messaging activities with only messages of a minimum length for replies, are considered for inclusion into the first N×M matrix.

The distribution of the number of other users or items with each characteristic value from among pool of other users or items from which the user would consider is identified, by adding one to the matrix element corresponding to the characteristic values of that user in a second N by M matrix, for each such other user the user would consider. The pool of other users from which the user may consider may include all users, all other users, or just the other users who have some of the characteristic values that the user has indicated as that user's subject preferences, which are preferences in other users or items that the user is interested. Such characteristic values may include the sex of the other users, distance from the user to the other user's residence, age or age range of the other user, and sexual preference of the other user. For example, if the user lives in a certain zip code of San Francisco, and indicates they are looking for other users who are heterosexual females age 25-30 who live within 7 miles of the user, only such other users are considered for the second N by M matrix. The scores for each element in the second matrix will correspond to the number of users, other users or other users in whom the user may be interested, who have both characteristic values corresponding to the element. A similar count may be made for items or items in which the user may be interested.

For each matrix element in both matrices, a ratio of the score for that element divided by the total scores for all elements in that matrix is computed and stored with the matrix element score.

Display Characteristic Trade-Offs

Statements and/or charts and/or graphs are displayed regarding trade-offs the user has made with respect to other users for which the user has performed activities 238. For example, a user may generally require a college degree before the user performs activities with respect to other users, except those who have a height between 5'11" and 6'2". In one embodiment a user is identified as having made a trade off by investigating patterns in the ratios of the N×M matrix of the user's activities compared against the ratios of the second N×M matrix. The ratios in the second matrix may be referred to as the expected values of the ratios.

If most or all of the ratios for a column or row exceed the expected values for that column or row by a threshold percentage, the user trades off the characteristic values not corresponding to that column or row for the characteristic value corresponding to the column or row.

For example, if all of the ratios the column or columns of the first matrix corresponding to height of the other user between 5'11" and 6'2" are higher than the expected values in the second matrix, the user trades off that height range for education status when the matrix corresponds to those two characteristics. The ratio for that height range, but for an education status of "high school" may be below the average, in which case the user trades off height for education status, as long as the education status is above high school.

Additional information may be obtained if the ratios for the other elements in the first matrix are lower, by at least a threshold amount, than expected, as indicated by the second matrix, showing the trade-off is particularly strong. The ratios may only be below the threshold percentage of expected ratios for certain columns or rows of the non-preferred characteristic, indicating that the trade-off is only strong for some values of the other characteristic.

One or more statements corresponding to such information may be "You prefer men 5'11" to 6'2" tall and will avoid those outside of such height range, even if they have high education levels" or "You prefer men 5'11" to 6'2" tall and will avoid those outside of such height range unless they have high education levels" may be made, based on such comparisons of the ratios in the two matrices, on a column and row basis. Statistical representations of the trade-offs, such as using a grouped bar chart, for example, showing the ratios for each education level at each height range, for the user's activities and those expected, may also or instead be displayed to the user.

Calculate Reverse Characteristic Preference Scores.

Reverse characteristic preference scores are calculated 246. Reverse characteristic preference scores are calculated the same way preference scores are calculated, except the activities used for the scores are those performed by other users with respect to the user. The characteristics used remain those of the other users, but those of other users who have shown an interest in the user.

To calculate the reverse characteristic preference scores, the other users who performed activities (e.g. searches, investigating a profile, messaging, responding, etc.) regarding the other user, including an item of the other user, are identified, and, for each potential value or potential range of values of each characteristic, a contribution (optionally weighted) is calculated, and the optionally weighted contributions are summed.

The weighted contribution may be a value of 1 for all activities, or different weighted contribution values may be used for different activities, where the weighted contribution value is higher for activities indicating a higher interest in the user or user's item, and lower for activities indicating a more casual interest in the user or user's item. For example, if a profile summary of the user appeared in another user's search results, and that other user has a value of "brown" for the hair color characteristic, and the other user clicks on the user's profile summary, the weighted contribution value for the "brown" value of the hair color characteristic for such activity may be 0.3, but if that other user messages the user, the weighted contribution value for the brown value of the hair color characteristic for such activity may be 0.5. A contribution value of 0.7 may be used for a reply to a message from the user if the reply has a length above a threshold value or contains words indicating an interest (and zero or a negative value otherwise), and the "brown" contribution value of the hair color characteristic for such activity may be 1.0 if the other user supplies a message to the user with words that indicate a date or other meeting is being requested or a reply such user indicates that a date or other meeting is being accepted.

It is noted that there is one reverse characteristic preference score for each potential value of each characteristic in one embodiment. For example, there would be another reverse characteristic preference score for a hair color value of "black". There may be another reverse characteristic preference score for a body type value of "athletic". A potential characteristic value is a value, or range of several values that are less than all of the potential characteristic values, that can be identified or selected by or for some or all users.

In one embodiment, for each potential characteristic value, only a single contribution value is supplied for the same activity performed by the same other user, or up to a threshold number of contribution values for the same other user, may be used. In one embodiment, only the highest contribution value or a threshold number of the highest values for the same other user for a single potential characteristic value is used for each other user. Thus, if the other user viewed the user's profile and messaged the user, only one contribution value for that other user would be made for each characteristic value specified by that other user.

In one embodiment, if another user updates a characteristic value, the old value is also retained with applicability dates and times for both characteristic values, and the characteristic value in effect at the time of the activity is used for the contribution value.

The weighted contribution values for each potential characteristic value are summed for the activities the other user performed with the user as the target to produce a reverse characteristic preference score for each potential characteristic value, and the reverse characteristic preference scores are sorted.

In one embodiment, the reverse characteristic preference scores are obtained from characteristics supplied by the other users to the primary web site, and in another embodiment, the reverse characteristic preference scores also include information retrieved from other web sites. In such embodiment, the reverse characteristic preference scores may also relate to interests and preferences the other user has expressed on other web sites and experiences the user reported on such other web sites.

Display of Characteristics of Other Users Who Prefer/Avoid the User

Statements and/or charts and/or graphs regarding characteristics of other users who prefer or avoid the user are displayed 248, using the reverse preference scores. In one embodiment, such characteristics of other users are displayed in a manner similar to that described above, except that the other users are those who have shown interest in the user or the user's items by way of activities performed, rather than other users for which the user performed an activity.

In one embodiment, users may supply comments or other rating information about users with whom they perform activities as part of step 216. For example, a user may mark another user whose profile is being viewed as a "favorite". In one embodiment, such comments or a summary of rating information (e.g. numbers in statements and/or charts and/or graphs) may be provided to the user who is the subject of the comments or rating information, such as "14 users marked you as a favorite and one user noted, 'Seems like my kind of guy'" as part of step 248.

In one embodiment, statements or statistical representations regarding the number or percentage of other users who performed an activity with respect to the user when the user was outside or inside the other user's subject preferences are also provided as part of step 248.

Provide Demographic Distribution Information for Other Users Who Showed an Interest in the Via Statements or Charts or Graphs.

Distribution information of other users who have shown an interest in the user is provided for each of one or more characteristics 250. Distribution information shows an entire distribution of potential characteristic values of the other users across a demographic or other characteristic. For example, a pie chart or bar graph showing percentages of the highest education level attained by other users who expressed an interest in the user, is provided.

Charts and/or graphs regarding distributions across subcategories of one or more categories of characteristics may be provided, and/or such information summarized via statements as part of step 250. For example, the top 5 subcategories within a category or top categories with a percentage of the total within the category may be identified and presented to the user, with the remaining subcategories combined and identified in the chart as "other". The charts and/or graphs may be presented separately by period of time in which the activity was performed or by type of activity, or for multiple or all periods and/or multiple or all types of activities may be combined, optionally weighting them as described above.

Statements similar to those described above may be made to provide distribution information, such as "Of the people who are interested in you, 30% have graduated high school, 25% have some college, 25% have graduated college, and 20% have a postgraduate degree." Other statements made from demographic characteristic distributions may involve the highest or lowest percentages subcategories in a category, such as "more people interested in you have graduated high school than have attained all other levels of education.

Display Statements or Statistics Indicating Subcategories of Users the User Prefers and/or Avoids In one embodiment, statements or statistical representations may be provided that indicate the top threshold number or bottom threshold number or all of characteristics of a given subcategory within a category among other users who showed an interest in the user 252 in a manner similar or identical to that described in step 234 except that the other users are those who expressed an interest in the user.

Identify Interest Statistics for Users Who have Shown an Interest in the User.

In one embodiment, statistics of interests or interests in common retrieved from social network and other web sites are identified 258, with such statistics including not just interests, but also preferences and experiences. In one embodiment, such statistics may be identified for other users in which the user's activities indicated an interest, other users whose activities indicated an interest in the user, or both, with each treated as a single set of statistics or as different sets of statistics. For each interest or interest in common in the hierarchy, for each other user, an interest score is incremented by an amount that may be the same for all activities, or may vary based on how much of an interest the activity of the user towards that other user, or vice versa or both, as described above. In one embodiment, for each other web site interest, preference or experience that is mapped to a graph as described in the related application, the interest increment is assigned to the graph node furthest from the root node that is identified by the user or held in common by both users. For example, the users may both have expressed an interest in the same movie, in which case the interest score for the graph node corresponding to that movie is incremented once, or the users may have expressed an interest in different movies that are comedies, in which case the interest score for the comedy movies is incremented once for each pair of movies that both correspond to comedy movies.

A final interest score may be computed for each node in the graph. The final interest score may be computed by selecting a root node of the graph, and adding to its interest score the interest scores of its child nodes in the graph, multiplied by a factor that gets smaller as a function of the distance in nodes of the child node whose score is being added from the root node. The factor for each distance in nodes is selected to prevent the nodes closer to the root from overwhelming the scores of the nodes further from the root, unless many child nodes of the root node are scored greater than a threshold value such as zero. Alternatively, the factor may be 1 for each descendant node, but there may be a factor by which the final interest scores are multiplied, after adding the interest scores of a nodes child nodes, with the factor that is smaller for nodes further from the root node or nodes than those closer to it.

In one embodiment, the factor is a function of both the distance from the node to which the final interest score is being added, and the percentage of the child nodes of that node that have an interest score above a threshold value. This allows a parent node of multiple child nodes to have a higher final interest score than the children, if most of the children have an interest score above the threshold, and a lower final interest score than the child nodes if only a minority of the child nodes have an interest score above the threshold.

In one embodiment, adjusted final interest scores are calculated based on the interest scores or final interest scores, by multiplying either by a factor that is highest for leaf nodes, and lower for nodes further from leaf nodes. This allows leaf nodes with the same interest score or final interest score as a parent node to have a higher adjusted final interest score.

Display Interest Cloud.

An interest cloud is displayed 260. In one embodiment, an interest cloud is a visual indication of a threshold number, such as thirty, of the hierarchical elements that have the highest interest scores or final interest scores or adjusted final interest scores.

In one embodiment, each node of the graph has a term that describes the node, such as "Comedy Movies" or "Gone With the Wind" or "Apple Computers". The terms corresponding to the threshold number of nodes with the highest interest scores or final interest scores or adjusted final interest scores are displayed, with a font size or area or other visual indicator of the percent of the interest score or final interest score or adjusted final interest score of the node divided by the sum of such threshold number of highest interest scores or highest final interest scores or highest adjusted final interest scores. Other means such as graphs or charts may be used to display the terms.

In one embodiment, two interest clouds are displayed as part of step 260, one for users in which the user showed an interest, and the other for users who showed an interest in the user, using each of the two graphs of interest scores, final interest scores or adjusted final interest scores as described above.

Compute Personality Traits Grids.

In one embodiment, personality traits grids are produced 262. Personality traits grids are a list of possible personality traits of a group of other users, and scores that indicate those personality traits with the greatest frequency in the group, with higher scores indicating higher frequency in the group. Frequency is measured by the number of users who have exhibited that personality trait. Two grids are produced, one grid for other users in which the user has expressed an interest and one for other users who have expressed an interest in the user.

Each of some or all characteristic values that relate to personality traits are mapped to one of the possible personality traits. For example, an answer to a question that indicates participation in a sport would map to the "sporty" personality trait. Each of some or all possible interest, preference or activities of the other user may be mapped to a personality trait.

In one embodiment, some of the above items may be mapped to more than one personality traits, for example, activities of a church sports league may be mapped to both a "sporty" personality trait, and a "spiritual" personality trait.

In one embodiment, each characteristic value or interest, preference or activity, adds a point to a score for the personality trait. In another embodiment, one point is added to the score of a personality trait for the user, provided the user has a threshold number of characteristic values, interests, preferences or activities that map to the personality trait. The threshold may be an average number of characteristic values, interests, preferences or activities that are mapped for all other users from among those the user may interact with or from among those other users who may interact with the user, for example, those within a distance specified by the user or other user and having an age, distance range, sex and sexual preference that would include the other user or the user. Thus, for the personality trait grid of other users in which the user has expressed an interest, to add a point to the score, the other user would have a higher number of characteristic values, interests, preferences or activities than the average number of other users who are within the distance range specified by the user, and those that correspond to the sex and sexual preference, and the age range specified by the user. For the personality trait grid of other users who have expressed an interest in the user, to add a point to the score, the other user would have a higher number of characteristic values, interests, preferences or activities than the average number of other users for whom the user is within the distance range specified by the other user, and those whose sex and sexual preference, and the age range specified by the other user would include the user.

In one embodiment, the mapping includes a value, and the value is used for the scoring, either by adding the value to the score or by using the value to compute the thresholds and determine whether the other user exceeds the threshold.

In one embodiment, the score for a personality trait is incremented for a user based on the actions of the user towards members of the group or actions of other users towards the user, using the same or similar weighting values described herein.

In one embodiment, other information about an other user that is not related to a characteristic, interest, preference or activity may be used to identify a personality trait. For example, if the other user has initiated a threshold number of communications with other users, the user may be considered to have an "outgoing" personality trait. If the user receives a higher than average percentage of messages initiated to the other user from among still other users who view the other user's profile, or the other user's profile receives a higher than average percentage of clicks from search results that include the other user's profile, or the user receives a higher than average percentage of response to messages the other user initiated, or any combination of these, the other user may be considered to have a "popular" personality trait.

Display Personality Traits of Other Users in Whom the User has Expressed an Interest and of Other Users Who have Shown an Interest in the User.

The personality traits with the highest scores are displayed to the user from the grid corresponding to other users in which the user has shown an interest 264 and from the grid corresponding to other users who have shown an interest in the user 266. In one embodiment, each personality trait has an icon associated with the personality trait, and such icon is displayed with the name of the personality trait. In one embodiment, only those personality traits with a score significantly higher than those of the other scores from the grid are displayed. In one embodiment, some personality traits are displayed if they are above the scores for a threshold percentage of those of the other users, such as the "popular" or "outgoing" personality traits listed above, even if they are not among the highest scores.

Identify Successful Users.

In one embodiment, a determination is made as to whether each user of the primary web site or a threshold number of such users has or has not been successful as to a purpose or most important purpose of the primary web site and such successful users are identified 268. The determination of whether a user has been successful may be different for different types of users. In one embodiment, for one type of user, such as a user who has not received a threshold number of messages per unit time, a determination that a user is successful is made if the user has received a threshold number of responses to messages the user has sent. The different set of users who have received a threshold number of messages per unit time may be determined to be successful if they receive at least one response to a message that they have sent either in response to a message they have received or a message they have initiated, if the message length of their message is a threshold length or contains certain words of interest, or all such users may be considered to be successful, or successful if they respond to any such messages or respond to any message with a response of at least a threshold length in characters or words. Other types of indicia of success may be used, such as requesting and receiving from the user answers to questions that can be used to identify success. The above analysis may be made for all users or for a limited group of users to identify a pool of successful users to be used for the user or all users.

In one embodiment, the pool of successful users are those that share at least one or more characteristics of the user. For example, if the user lives in a certain vicinity, is a heterosexual male, of a certain age, of a certain body style or range of height and weight combination, and has a certain amount of hair as reported by the user, the pool of successful heterosexual males with those same characteristics in the same vicinity are identified for such user. Characteristics of a user that are used to identify successful users may be characteristics received from the user, or may be instead or in addition, inferred from other users activities towards that user, for example, by segregating the user into low popularity, medium popularity, and high popularity groups, based on the percentage of people who message the user or add the user to a list of favorite other users after seeing photos or reading characteristic and other information about that user, and the number of people who see summary information for the user and a profile, and click on a link to see more information about that user.

Identify Successful Activity Statistics.

The average amount (e.g. number or rate per unit time) of each of one or more activities of the pool of successful users is identified and optionally stored for use when analyzing other users or other similar users 270. Activities may be different activities that can be performed on the primary web site, such as filling out a profile on a dating web site (e.g. answering questions and supplying essay answers to questions), searching or messaging, and such activities may be further broken down into activities with other attributes, for example, messages over a certain length in words and messages under that length, or messages to another user that use a word in the other user's characteristics and messages that do not use any such words. Filling out a profile may be measured by a percentage of questions answered and such questions may be broken down into one or more sets of questions, each of which may be measured. The sets may be identified using conventional regression analysis techniques to identify a set of questions that, when answered, tends to make the user more successful than the remaining questions. Any number of such sets may be used.

Identify/Display Casual Activity Statistics for the User.

The number or rate of casual activities the user performed on each of the last few days or other periods of time (e.g. weeks or three day periods) is identified for up to a threshold number such as thirty of the last days or other periods, and one or more statements describing such number or rate is made and/or such number or rate is plotted on one or more graphs or charts showing one or more casual activities 274. As used herein, "casual activity" is an activity, such as a search, that a user makes before the user commits to an interest in another user or item. For each of one or more casual activities, the average number or rate of such activities of successful users or successful users who share similar characteristics as the user as described above is also displayed with the number or rate of the user. For example, if the user has performed 3 searches over each of the last three days, and successful users perform an average of 8 searches per day, the number of searches the user has performed in each of the last three days may be plotted on a graph over time, and a red dashed line showing 8 searches across all days may be displayed as part of the graph, with an indication that the dashed line corresponds to the average number of searches per day that successful users performed. A suggestion to perform each activity more frequently may be made to users whose average number of activities over some or all of the period displayed (e.g. the most recent 30%) is below the average number of that activity performed by users who have achieved success on the web site.

Identify/Display Serious Activity Statistics for the User.

The number or rate of serious activities the user performed on each of the last few days or other periods of time (e.g. weeks or three day periods) is identified for one or more periods of up to a threshold number such as thirty of the last days or other periods, and such number or rate plotted on one or more graphs or charts showing one or more serious activities 276. As used herein, a "serious activity" is an activity, such as sending a message or responded to a message, that is performed after the user has committed an interest in a specific other user or item. The number or rate of messages initiated by the user or number or percentage of sent responses to messages received by the user or other serious activities is displayed in a manner similar to that described above for the other activities. In one embodiment, messages and responses may be segregated into one or more groups (for the user and for other users used to compute the averages), for example, into a group of those longer than a certain length, and another group of those shorter than a certain length, and/or messages that mention a characteristic of the other user and those that don't, messages that use or avoid words within a group (e.g. avoiding negative words or including positive words), messages sent to older or much older, younger or much younger, or taller or shorter other users, messages sent to very popular other users, and less popular other users, messages sent to users having a certain body type or height-weight relationship, and so on. The statements or charts or graphs used to display such information may ignore certain of the other groups (e.g. showing messages initiated by the user above a threshold length and ignoring messages initiated by the user below the threshold length) or may display all such groups, such as by using different charts or graphs or by using different symbols or colors on the same graph, with the averages displayed using a similar symbol or color as the user's serious activity level (e.g. light blue/dark blue) or a key.

Identify/Display Number of Other Users Viewing User's Profile, Suggestions for Increases.

The number of other users who have viewed the user's profile, optionally within a certain period of time, is displayed, optionally over multiple periods of time such as each of the last ten days, and suggestions are made regarding increasing the number of views 278. Having higher number of views of a profile is a prerequisite to success on a dating web site, and charts and/or graphs and/or statements of other activities that are prerequisites of success on other web sites may be displayed instead of profile views. Statements may include statements of trends, and may include potential causes and effects of actions of the user, such as "Since you added more photographs, your profile views have increased by 30%." Information regarding other activities performed by other users with respect to the user may be presented in a similar fashion, such as the number of messages initiated by other users, or the ratio of profile views to messages initiated by other users.

In one embodiment, suggestions may include suggesting the user post more photographs of himself, herself or the item, post different photographs of himself, herself or the item, post photographs of himself or the item that shows a more complete view, such as a full body shot of the user or the item. In one embodiment, such suggestions are made without regard for the activity level identified, and in another embodiment, the users identified as successful are investigated to determine the level of the same activity with respect to the average successful user and the suggestions are provided only to those below that activity level or well below such activity level.

Process More Users.

If there are more users for the trigger 280, the next user for the trigger is selected 282 and the method continues at step 222 using the newly selected user. Otherwise 280, the method continues at step 218.

System.

Figure 3A:
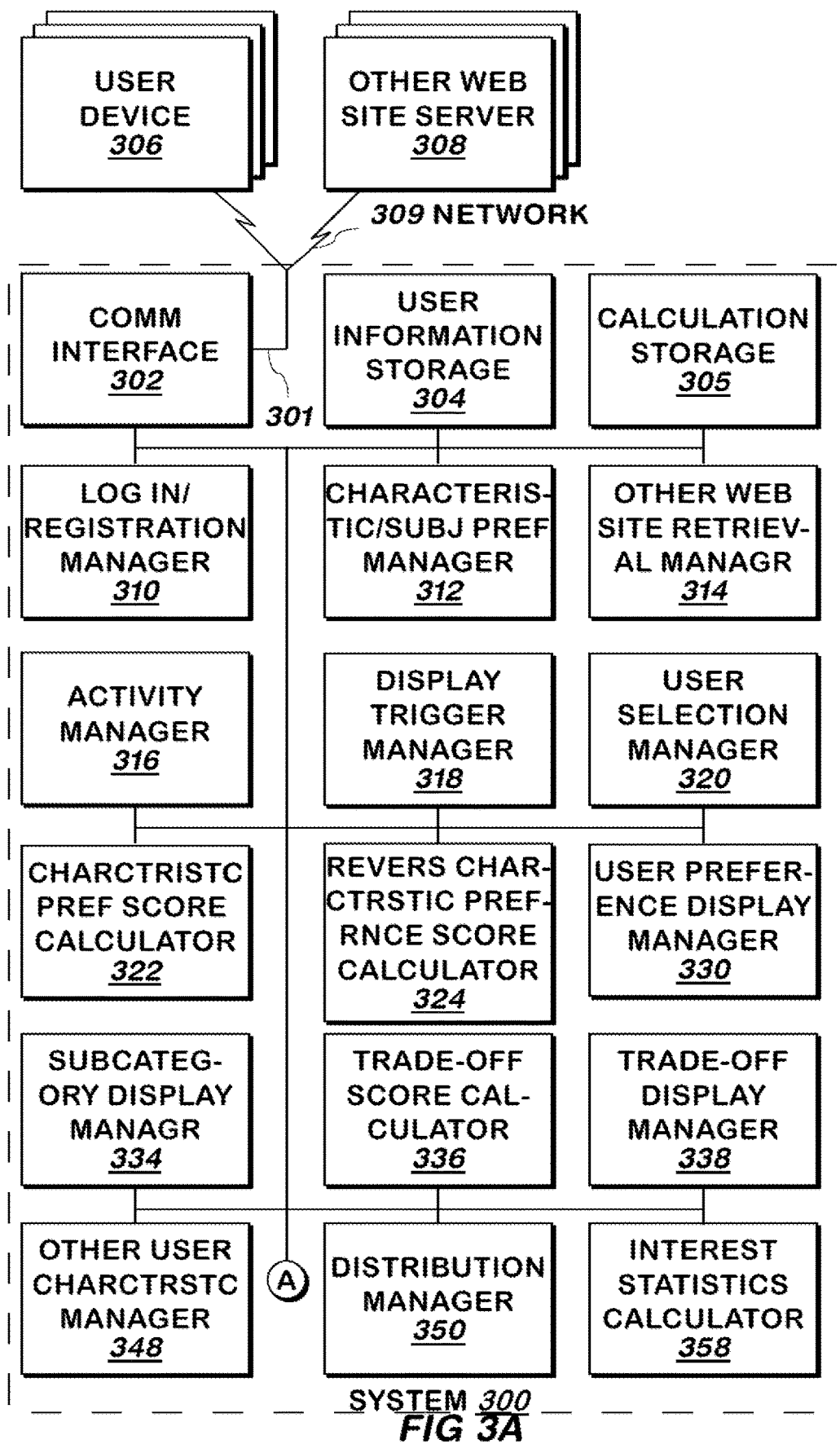
FIG. 3, consisting of FIGS. 3A and 3B, is a block schematic diagram of a system for providing information about users corresponding to activities on a web site according to one embodiment of the present invention.
Figures 3, 3A, 3B:
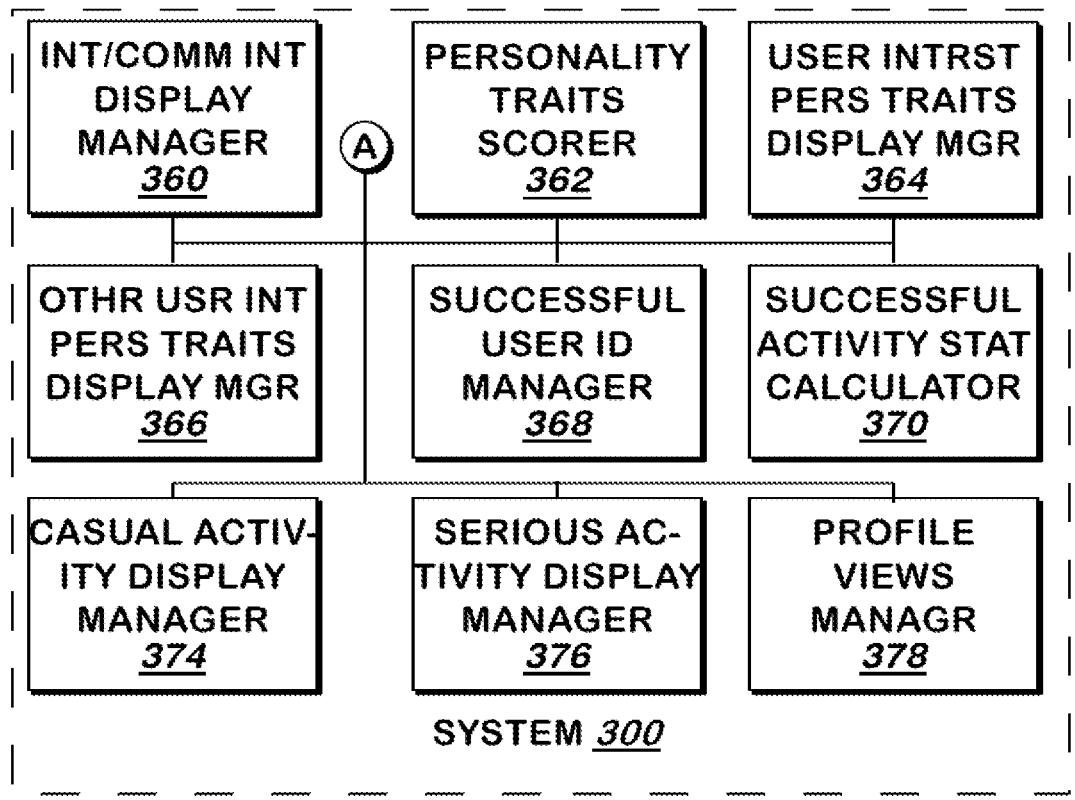

FIG. 3, consisting of FIGS. 3A and 3B, illustrates a system 300 for providing information about users' activities on a web site according to one embodiment of the present invention. Referring now to FIGS. 2 and 3, users interact with system 300 via user device 306 coupled to network 309, which may include a conventional computer system including a desktop, laptop, tablet, or other smart device or computer system. Communication interface 302 includes a conventional communication interface, such as a TCP/IP-compatible communication interface running suitable communication protocols, such as Ethernet and TCP/IP. Communication interface 302 is coupled to a conventional computer network 309 such as one or more Ethernet networks, the Internet, or both. Unless otherwise specified, all communication with system 300 is made via communication interface 302.

Log in/registration manager 310 provides a user interface to the user via user device 306 that allows the user to receive or provide registration information, such as a user identifier and password, and allows the user to supply other web site login information as described above. As noted above, the user may supply a username and password via a user interface provided by the respective other web site 308 to which the user identifier and password corresponds, and log in/registration manager 310 may generate an alternate user identifier, and provide such alternate user identifier or the user identifier of the other site to the other web site, which, after the user authenticates himself or herself to the other web site 308, allows access by system 300 to experience, interest, and a preference information stored by such other web site 308. Log in/registration manager 310 stores all such information into user information storage 304, associated with the user identifier of the user. Some or all of the other web site login information and/or the alternate user identifier provided is stored with an identifier of the other web site, which may be selected by the user, using the user interface that log in/registration manager 310 provides. Each other web site 308 includes conventional computer systems including conventional web servers that provide the functionality of the other web site and is coupled to network 309. Such servers may include social network servers such as servers that operate the FACEBOOK web site, the NETFLIX web site, and other conventional web sites.

Log in/registration manager 310 allows the user to log in on a subsequent visit using conventional user identifier and password authentication techniques. After the user has received or supplied registration information, either initially, or at a subsequent login, log in/registration manager 310 provides a user interface to allow the user to supply characteristics and/or subject preferences, and perform other activities as described herein. If the user uses the user interface to provide characteristic and/or subject preferences, log in/registration manager 310 signals characteristic/subject preference manager 312. In one embodiment, the signals provided by log in/registration manager 310 are provided with the user identifier of the user, or conventional cookie or REST techniques may be used to pass the user identifier. The entities of system 300 may access information described herein as may be useful.

When signaled, characteristic/subject preference manager 312 supplies a user interface to allow the user to supply characteristics, and subject preferences as described herein. Characteristic/subject preference manager 312 stores such characteristics and subject preferences into user information storage 304, associated with the user identifier of the user who supplied such information.

If the user uses the user interface provided by log in/registration manager 310 to perform activities as described herein, log in/registration manager 310 signals activity manager 316 as described herein. Activity manager 316 provides a user interface to allow the user to request to perform activities as described herein, and upon receipt of such requests, activity manager 316 performs the request using conventional techniques and the information for the user and/or other users stored in user information storage 304, stores into user information storage 304 the user identifier, one or more other user identifiers corresponding to the activity, an identifier of the activity, parameters of the activity or other information as described herein, and the current date and time retrieved from an operating system (not shown). Activities may include conventional online dating activities such as are performed on the website ZOOSK.COM or any other conventional activity that users perform on a website with respect to other users of the web site. For example, if the user clicks on a link to another user that is displayed in a set of search results of links to multiple users, then activity manager 316 stores the user identifier of the user performing action, the user identifier of the other user corresponding to the link that the user clicks, and the current date and time into user information storage 304. The contents of a message or a reply may be considered a parameter, and if such activity is performed, such information is stored with the user identifiers of the sending and receiving users, and the current date and time. Other information can include the user identifiers of users whose summary information is displayed as search results.

Occasionally or periodically, other web site retrieval manager 314 retrieves from other web sites 308, the experience, interest, and preference information of the user as described herein, and stores such information into user information storage 304, associated with the user identifier of the user. As noted, to retrieve such information, other web site retrieval manager 314 retrieves the other web site log in information or the alternate user identifier of the user stored in user information storage 304, and provides some or all of it to the other web site server 308 to which it corresponds. Other web site retrieval manager 314 may perform such retrieval for any number of users at any number of other web sites, such as for all of the users who have provided login information for other web sites, and from all of such other web site servers 308. Other web site retrieval manager 314 may store the date and time of each retrieval, and provide such date and time to be other web site 308 at the next subsequent retrieval to allow the other web site to provide, or other web site retrieval manager 314 to store, only such information that has been updated or added to such other web site since such date and time. Other conventional deduplication techniques may be used instead of, or in addition to, the date and time that described herein.

Display trigger manager 318 sets a timer via the operating system (not shown), and when the timer elapses, display trigger manager 318 signals user selection manager 320. User selection manager 320 selects a first user from the users whose information is stored in user information storage 304, and provides the user identifier to characteristic preference score calculator 322. In one embodiment, the user may request the information about activities described herein, via the user interface provided by log in/registration manager 310. In such embodiment, log in/registration manager 310 provides the user identifier of such user to user selection manager 320, which may suspend any in-progress selection process of users as described herein, and provide the user identifier it receives to characteristic preference score calculator 322, after which time user selection manager 320 resumes any interrupted selection of users from user information storage 304.

When it receives the user identifier, characteristic preference score calculator 322 uses the information for the activities stored in user information storage 304 for the user whose user identifier it receives, and uses the characteristic and subject preference information stored for such other user in user information storage 304 and any other information for the user in user information storage 304 to calculate the characteristic preference scores as described above, and stores such characteristic preference scores, and the identifier of the user into calculation storage 305.

Characteristic preference score calculator 322 provides a pointer to the characteristic preference scores stored in calculation storage 305, and the user identifier it received to reverse characteristic preference score calculator 350.

When it receives the user identifier and pointer, reverse characteristic preference score calculator 350 calculates, as described above with respect to step 250, the reverse preference scores using activities of other users towards the user whose identifier it receives, such activities having been stored in user information storage 304, and any other information stored in user information storage 304, stores such reverse characteristic preference scores and the user identifier it receives into calculation storage 305, and builds pointer to such information and the pointer and user identifier it received into an information object and provides the information object to other user characteristic manager 348.

When it receives such information object, user preference display manager 330 builds and stores into calculation storage 305 the display of information described above with respect to step 230 using the characteristic preference scores corresponding to the information object it receives, such display of information being stored associated with the user identifier of the user stored with the preference scores corresponding to the information object user preference display manager 330 received. The display of information described herein may include statements, charts, graphs or other statistical representations. User preference display manager 330 may additionally use the subject preferences stored in user information storage 304 to provide such information. User preference display manager 330 provides the information object to subcategory display manager 334.

When it receives the information object, subcategory display manager 334 builds and stores into calculation storage 305 the display of information described above with respect to steps 234 and 252 using the characteristic preference scores and reverse characteristic preference scores corresponding to the information object it receives. Such display of information stored associated with the user identifier of the user stored with the preference scores corresponding to the information object that subcategory display manager 334 receives. Subcategory display manager 334 provides the user identifier corresponding to the information object it receives to trade-off score calculator 336.

When it receives the user identifier, trade-off score calculator 336 uses the information stored in user information storage 304 to calculate the matrix element scores for the user corresponding to the user identifier it receives, for example, by populating the two matrices as described above with respect to step 236. Trade-off score calculator 336 stores such scores and the user identifier it receives into calculation storage 305, adds a pointer to them to the information object, and provides the information object to trade-off display manager 338.

When it receives the information object, trade off display manager 338 identifies, builds and stores into calculation storage 305, associated with the user identifier from the information object, the display of information describing the trade-offs the user has made among characteristics of other users as described above with respect to step 236. Trade-off display manager 338 provides the information object it receives to other user characteristic manager 348.

When it receives such information object, other user characteristic manager 348 identifies, builds and stores into calculation storage 305, associated with the user identifier of the information object, the display of information describing characteristics of other users who have performed activities regarding the user using the reverse characteristic preference scores corresponding to the information object it receives and other information as described above with respect to step 248. Other user characteristic manager 348 provides the information object it receives to distribution manager 350.

When it receives the information object, distribution manager 350 identifies, builds and stores into calculation storage 305 the display of information describing demographic distribution information as described above with respect to steps 232 and 250 using the characteristic preference scores and the reverse characteristic preference scores corresponding to the information object it receives and other information. Distribution manager 350 provides the information object it receives to interest statistics calculator 358.

When it receives the information object, interest statistics calculator 358 uses the user identifier contained therein to calculate the interest statistics described above with respect to step 258 using the other web site information, and optionally characteristics, of other users who performed activities with respect to the user, other users with respect to those whom the user performed activities, or that of the user has in common with such other users as described above, and any other information stored in user information storage 304, stores the user identifier, and the interest statistics into calculation storage 305, adds a pointer to such information to the information object and provides the information object to interest/common interest display manager 360.

When it receives the information object, interest/common interest display manager 360 identifies, builds and stores into calculation storage 305 associated with the user identifier from the information object the display of information described above as the interest cloud and/or common interest cloud that describes the interests of other users whose activities involved the user, and/or interests of other users in whom the user showed an interest or interests of such other users in common with the user as described above with respect to step 260, using the interest statistics corresponding to the information object it receives. An interest in another user is shown via activities performed on the web site by the user towards the other user. Interests/common interest display manager 360 provides the information object to personality traits scorer 362.

When it receives the information object, personality traits scorer 362 creates the personality traits grids as described above with respect to step 262 of FIG. 2 using the information stored in user information storage 304, stores them into calculation storage 305, and provides a pointer to such grids in the information object. Personality traits scorer 362 provides the information object to user interest personality traits display manager 364.

When it receives the information object, user interest personality traits display manager 364 uses the appropriate grid and optionally the information in user information storage to build the display of information described above with respect to step 264 and stores such information into calculation storage 305 associated with the user identifier from the information object. User interest personality traits display manager 364 provides the information object to other user interest personality traits display manager 366.

When it receives the information object, other user interest personality traits display manager 366 uses the appropriate grid and optionally the information in user information storage to build the display of information described above with respect to step 266 and stores such information into calculation storage 305. Other user interest personality traits display manager 366 provides the information object to successful user identification manager 368.

When it receives the information object, successful user identification manager 368 uses the activity information stored in user information storage 304 to identify successful users, or successful users corresponding to the user whose user identifier it receives in the information object as described above with respect to step 268. Successful user identification manager 368 stores the identifier of the user it receives, and a list of the identifiers of the successful users it identifies into calculation storage 305, adds a pointer to such information to the information object and provides the information object to successful activity statistics calculator 370.

When it receives the information object, successful activity statistics calculator 370 uses the list of successful users in statistics storage 305, and the activity information for such users in user information storage 304 to identify the successful activity statistics described above with respect to step 270. Successful activity statistics calculator 370 calculates such statistics for both casual and serious activities and stores such statistics with the user identifier of the user into calculation storage 305. Successful activity statistics calculator 370 adds a pointer to such information to the information object and provides the information object to serious activity display manager 374.

When it receives the information object, casual activity display manager 374 uses the activity information stored in user information storage 304 for the user of the user identifier corresponding to the information object it receives to identify the activity level of the user with respect to casual activities, as described above with respect to step 274. Casual activity display manager 374 additionally uses the statistics for one or more casual activities stored in calculation storage 305, to identify, build and store into calculation storage 305 associated with the user identifier from the information object, corresponding to the information object it receives, the display of information describing the user's casual activity level, compared or overlaid or compared with the average activity level of the same one or more casual activities of successful users, as described above with respect to step 274. Casual activity display manager 374 provides the information object it received to serious activity display manager 376.

When it receives the information object, serious activity display manager 376 uses the activity information stored in user information storage 304 for the user of the user identifier corresponding to the information object it receives to identify the activity level of the user with respect to serious activities, as described above with respect to step 276. Serious activity display manager 376 additionally uses the statistics for one or more serious activities stored in calculation storage 305 corresponding to the information object it received, to identify, build and store into calculation storage 305 associated with the user identifier from the information object, the display of information describing the user's serious activity level, compared or overlaid with the average serious activity level of successful users as described above with respect to step 276. Serious activity display manager 376 provides the information object it receives to profile views manager 378.

When it receives the information object, profile views manager 378 uses the activity information of other users who viewed the profile of the user whose user identifier it receives in the information object that is stored in user information storage 304 to identify the number of profile views of such user by other users, optionally over time, as described above with respect to step 278, and identify, build and store into calculation storage 305 the display of information describing the number or rate of profile views of such user as described above with respect to step 278. Profile views manager 378 signals user selection manager 320. User selection manager 320 selects the next user and repeats the process for the newly selected user until all users that have not been recently selected have been selected.

The process of selection may be run during slower periods, when users are not performing as many activities. For example, user selection manager 320 may first check a load indicator on the operating system (not shown), and only select a user when the load indicator is below a threshold amount or percentage, setting a timer on the operating system (not shown) to signal again at a later time, when the process is repeated. Thus, such selection process may be interrupted, causing it to be performed over a period of many hours, days or weeks.

Each display of information stored in calculation storage 305 as described herein is stored associated with the user identifier of the user corresponding to the user identifier or pointer received by the respective element. When the user logs in to log in/registration manager 310, log in/registration manager 310 checks calculation storage 305 for displays of information associated with the user identifier of the user who logged in that may be stored as described above but not already provided to the user. If such displays of information exist, log in/registration manager 310 provides them for display or provides a link to them, to the user. If the user clicks the link, log in/registration manager 310 provides the displays of information to the user for display, and marks such information as having been provided to the user. All information provided by or to the user as described herein may be provided via a browser or application or other manner on user system 306.

As noted above, the user may use log in/registration manager 310 to generate and view such information upon request by the user, for example. via a button, link or other user interface control it provides. If so, log in/registration manager 310 provides the user identifier of the user making such request to user selection manager 320, which selects that user as the first and only user of the trigger and performs the process as described above for that user. If user selection manager 320 is in the process of selecting users from a different trigger, user selection manager 320 suspends such selection to perform the selection of the user and, when signaled to select the next user by profile views manager 378, signals log in/registration manager 310 with the identifier of the user it received, and then resumes the selection for any other trigger for which it had been selecting users as described herein. Log in/registration manager 310 then provides the displays of information corresponding to the user identifier that are stored in calculation storage 305 or links thereto and marks such information as having been provided to the user when the user views such information as described herein.

Users the User Avoids and Other Users Avoiding the User.

As described above, information about the other users in which the user has shown an interest or information about other users that showed an interest in the user, each via their respective actions on the web site is analyzed and displayed.

In one embodiment, in addition to such information or instead of such information, the same or similar information about other users the user expresses little or no interest, and/or information about other users who have expressed little or no interest in the user may be provided to the user.

To determine that a first user has little or no interest in a second user, actions performed by the first user or not performed by the first user when information from or about the second user appears to the first user may be used.

For example, summary information of the second user could show up in search results of the first user, but the first user doesn't click on their profile information. Or the user clicks on their profile information but clicks back to the search results rapidly. Or the second user sends a message indicating interest or a message with text to the first user, but the first user doesn't respond, or responds with a short message or one with words indicating disinterest such as "not interested" or "thanks but". Or the second user sends a gift to the first user but the first user doesn't respond or responds with words indicating disinterest or a short message. The second user may appear as a targeted match to the first user, but the first user does not initiate any form of communication to the second user.

The activity weightings described herein may be replaced with weightings or contributions or additions that correspond (either proportionally or inversely proportionally) to an indication of the degree of disinterest, such as an amount of effort the second user has expended to cause their information to be displayed to the first user, and/or how customized the display of the second user's information was towards the first user. Thus, for example, a message from the second user or a targeted match with that second user to which the first user indicates disinterest may indicate more disinterest and receive a higher weighting/contribution/addition than if the second user appears in search results but the first user does not click on the profile of that user, which receives a low weighting/contribution/addition. Clicking back rapidly may indicate a medium degree of disinterest.

In one embodiment, the displays of information that correspond to other users not interested in the user may be targeted towards information about the user. For example, if the user smokes and the other users tend to show little or no interest in users who smoke, that information may be highlighted to the user even if it is not the most prevalent characteristic such other users avoid.

SUMMARY OF CERTAIN EMBODIMENTS

A method of reporting characteristics about multiple actions taken with respect to a primary user, is shown, the method including: receiving and storing into a non-volatile storage an indication of one of multiple values, each of the plurality of values representing possible characteristic values, for each of multiple characteristics, from each of multiple users who take at least one of multiple actions with respect to a primary user; receiving an electronic request corresponding to each of the plurality of the actions of the plurality of users to be taken towards the primary user, each action in the plurality indicating one of multiple different levels of interest in the primary user by the user making the request; storing into the non-volatile storage an indication of the request, associated with identifiers of the user in the plurality of users from whom the request was received and the primary user; fulfilling the request by a hardware processor system using the non-volatile storage; associating by the hardware processor system including the non-volatile storage a weight with each indication of actions in the plurality, in proportion to an estimated level of interest in the primary user indicated by the taking of the corresponding action; for each of at least some of the requests stored into the non-volatile storage, for each of the plurality of indications of the characteristic values received from the user in the plurality from whom said request was received, multiplying, by the hardware processor coupled to the non-volatile storage, the value of each of the characteristics of the user from which the request was received by the weight assigned to the request to produce a product; summing, by the hardware processor system coupled to the non-volatile storage, the products for each value of each characteristic across all of the requests to produce a sum for each characteristic value in the plurality; selecting, by the hardware processor system coupled to the non-volatile storage, at least one of a highest sum for each characteristic value; and providing at least one English language statement to the primary user describing at least one of the highest sums for each characteristic value as a characteristic of users in the plurality who are interested in the primary user.

The method includes an optional feature whereby, for a given user in the plurality of users, no more than one request per user is contributes to the sum.

The method of the preceding paragraph includes an optional feature whereby for a given user in the plurality of users, the request corresponding to the highest weight contributes to the sum.

The method includes an optional feature whereby at least one value of the characteristic for a user in the plurality of users is summed responsive to whether it was in effect at a time the request was received from the user.

The method includes an optional feature whereby: the providing is performed on a first website; and at least one of the plurality of characteristic values used to compute at least one of the plurality of sums is received from a second web site, different from the first web site.

The method may optionally additionally include: selecting, by the hardware processor system coupled to the non-volatile storage, at least one of a lowest sums for each characteristic value; and providing at least one English language statement to the primary user describing the selected at least one of the lowest sums for each characteristic value as a characteristic of users in the plurality who are disinterested in the primary user.

A system for reporting characteristics about multiple actions taken with respect to a primary user is described, the system including: a characteristic/subject/preference manager including a hardware computer processor and having an input for receiving an indication of one of multiple values, each of the plurality of values representing possible characteristic values, for each of multiple characteristics, from each of multiple users who take at least one of multiple actions with respect to a primary user, the characteristic/subject/preference manager for proving at an output the values of the plurality of characteristics for each of the plurality of users associated with the identifiers of the respective users from which the values were received; an activity manager including a hardware computer processor having an input for receiving an electronic request for each of the plurality of the actions the plurality of users wish to be taken towards the primary user, each action in the plurality indicating one of multiple different levels of interest in the primary user by the user making the request, the activity manager for providing at an output an indication of the request, associated with identifiers of the user from whom the request was received, and for fulfilling the request via the activity manager output; a reverse characteristic preference score manager including a hardware processor and having an input coupled to the activity manager output for receiving the indication of the request, associated with identifiers of the user from whom the request was received and coupled to the characteristic/subject/preference manager output for receiving the values of the plurality of characteristics for each of the plurality of users associated with the identifiers of the respective users, the reverse characteristic preference score manager for associating a weight with each indication of actions in the plurality, in proportion to an estimated level of interest in the primary user indicated by the taking of the corresponding action and, for each of at least some of the indications of the requests, for each of the plurality of indications of the characteristic values received from the user from whom said request was received, multiplying, each of the values of the characteristics of the user from which the request was received, by the weight assigned to the request to produce a product, for summing the products for each value of each characteristic across all of the requests to produce a sum for each value of each characteristic, and for providing at an output the sum for each value of each characteristic in the plurality; and a user preference display manager having an input coupled to the reverse characteristic preference score manager output for receiving the sum for each value of each characteristic, the user preference display manager for selecting at least one of a highest sum for each characteristic value, and for providing at an output at least one English language statement to the primary user describing at least one of the highest sums for each characteristic value as a characteristic of users in the plurality who are interested in the primary user.

The system includes an optional feature whereby, for a given user, no more than one request per user contributes to the sum provided at the reverse characteristic preference score manager output.

The system of the prior paragraph includes an optional feature whereby, for a given user, the request corresponding to the highest weight contributes to the sum provided at the reverse characteristic preference score manager output.

The system includes an optional feature whereby: the activity manager provides the indication of the request at the activity manager output additionally associated with a time stamp corresponding to a time it received the request; the reverse characteristic preference score manager input is additionally for receiving the time stamp; and the reverse characteristic preference score manager sums at least one product for at least one value of the characteristic for a user in the plurality, responsive to whether it was in effect at a time the request was received from the user.

The system includes an optional feature whereby: the user preference display manager provides the statement as part of a first website; the characteristic/subject/preference manager input is coupled to a second web site, different from the first web site, for receiving at least one of the plurality of values; and at least one of the plurality of characteristic values received by the characteristic/subject/preference manager from the second web site is used by the reverse characteristic preference score manager to compute at least one of the plurality of sums provided at the reverse characteristic preference score manager output.

The system includes an optional feature whereby the user preference display manager is additionally for: selecting at least one of a lowest sums for each characteristic value; and providing at the user preference display manager output, at least one English language statement to the primary user describing the selected at least one of the lowest sums for each characteristic value as a characteristic of users in the plurality who are disinterested in the primary user.

A computer program product including a computer useable medium having computer readable program code embodied therein for reporting characteristics about multiple actions taken with respect to a primary user is described, the computer program product including non-transitory computer readable program code devices configured to cause a computer system to: receive and store into a non-volatile storage an indication of one of multiple values, each of the plurality of values representing possible characteristic values, for each of multiple characteristics, from each of multiple users who take at least one of multiple actions with respect to a primary user; receive an electronic request corresponding to each of the plurality of the actions of the plurality of users to be taken towards the primary user, each action in the plurality indicating one of multiple different levels of interest in the primary user by the user making the request; store into the non-volatile storage an indication of the request, associated with identifiers of the user in the plurality of users from whom the request was received and the primary user; fulfill the request; associate a weight with each indication of actions in the plurality, in proportion to an estimated level of interest in the primary user indicated by the taking of the corresponding action; for each of at least some of the requests stored into the non-volatile storage, for each of the plurality of indications of the characteristic values received from the user in the plurality from whom said request was received, multiply the value of each of the characteristics of the user from which the request was received by the weight assigned to the request to produce a product; sum the products for each value of each characteristic across all of the requests to produce a sum for each characteristic value in the plurality; select at least one of a highest sum for each characteristic value; and provide at least one English language statement to the primary user describing at least one of the highest sums for each characteristic value as a characteristic of users in the plurality who are interested in the primary user.

The computer program product includes an optional feature whereby, for a given user in the plurality of users, no more than one request per user is contributes to the sum.

The computer program product in the preceding paragraph includes an optional feature whereby, for a given user in the plurality of users, the request corresponding to the highest weight contributes to the sum.

The computer program product includes an optional feature whereby at least one value of the characteristic for a user in the plurality of users is summed responsive to whether it was in effect at a time the request was received from the user.

The computer program product includes an optional feature whereby: the providing is performed for a first website; and at least one of the plurality of characteristic values used to compute at least one of the plurality of sums is received from a second web site, different from the first web site.

The computer program product, may optionally additionally include non-transitory computer readable program code devices configured to cause the computer system to: select at least one of a lowest sums for each characteristic value; and provide at least one English language statement to the primary user describing the selected at least one of the lowest sums for each characteristic value as a characteristic of users in the plurality who are disinterested in the primary user.

What is claimed is:

1. A method of reporting characteristics about a plurality of actions taken with respect to a primary user, comprising:
    receiving and storing into a non-transitory storage an indication of one of a plurality of values for each of a plurality of characteristics, each of the plurality of values representing possible characteristic values, from each of a plurality of users who take at least one of the plurality of actions with respect to the primary user;
    receiving an electronic request corresponding to each of the plurality of the actions of the plurality of users to be taken towards the primary user, each action in the plurality having one of a plurality of types, each type in the plurality indicating one of a plurality of different levels of interest in the primary user by said user making the request corresponding to said action, wherein each type in the plurality of types is represented by at least one of the actions in the plurality of actions;
    storing into the non-transitory storage an indication of each request, associated with an identifier of the user in the plurality of users from whom the request was received and an identifier of the primary user;
    fulfilling each request by a hardware processor system using the non-transitory storage and a TCP/IP-compatible communication interface;
    associating by the hardware processor system coupled to the non-transitory storage a contribution value with each indication of request in the plurality, in proportion to an estimated metric indicated by the type of the action corresponding to said request;
    for each of at least some of the indications of the requests stored into the non-transitory storage, for each of the plurality of indications of the characteristic values received from the user in the plurality from whom said request was received, assigning, by the hardware processor system coupled to the non-transitory storage, to each of the values of each of the characteristics of the user from which the request was received, the contribution value associated with said request;
    summing, by the hardware processor system coupled to the non-transitory storage, the contribution values assigned to each value of each characteristic across all of the requests to produce a sum for each characteristic value in the plurality;
    selecting, by the hardware processor system coupled to the non-transitory storage, at least one of a highest sum for each characteristic value; and
    providing via the TCP/IP-compatible communication interface at least one English language statement to the primary user describing at least one of the selected highest sums for at least one characteristic value as a characteristic of users in the plurality who are interested in the primary user.

2. The method of claim 1, wherein, for a given user in the plurality of users, no more than one request contributes to the sum for each characteristic value.

3. The method of claim 2, wherein, for the given user in the plurality of users, only a request corresponding to a highest contribution value contributes to the sum for each characteristic value.

4. The method of claim 1, wherein the contribution value is assigned to at least one value of at least one characteristic for a user in the plurality of users responsive to whether said at least one value of at least one characteristic for the user was in effect at a time a corresponding request was received from said user.

5. The method of claim 1, wherein:
    the providing is performed on a first website; and
    at least one of the plurality of characteristic values used to compute at least one of the plurality of sums is received from a second web site, different from the first web site.

6. The method of claim 1, additionally comprising:
    selecting, by the hardware processor system coupled to the non-transitory storage, at least one of a lowest sums for each characteristic value in the plurality; and
    providing at least one additional English language statement to the primary user describing the selected at least one of the lowest sums for each characteristic value as a characteristic of users in the plurality who are disinterested in the primary user.

7. A system for reporting characteristics about a plurality of actions taken with respect to a primary user, comprising:
    a characteristic/subject/preference manager comprising a hardware computer processor and having an input for receiving an indication of one of a plurality of values for each of a plurality of characteristics, each of the plurality of values representing possible characteristic values, from each of a plurality of users who take at least one of the plurality of actions with respect to the primary user, the characteristic/subject/preference manager for providing at an output the values of the plurality of characteristics for each of the plurality of users, associated with identifiers of the respective users from which the values were received;

an activity manager, comprising the hardware computer processor, having an input for receiving an electronic request for each of the plurality of the actions the plurality of users wish to be taken towards the primary user, each action in the plurality having one of a plurality of types, each type in the plurality indicating one of a plurality of different levels of interest in the primary user by said user making the request corresponding to said action, the activity manager for providing at an output an indication of each request, associated with an identifier of the user from whom the request was received and an identifier of the primary user, and for fulfilling each request via a TCP/IP-compatible communication interface coupled to the activity manager output, wherein each type in the plurality of types is represented by at least one of the actions in the plurality of actions;

a reverse characteristic preference score manager comprising a hardware processor and having an input coupled to the activity manager output for receiving the indication of each request, associated with the identifier of the user from whom the request was received and coupled to the characteristic/subject/preference manager output for receiving the values of the plurality of characteristics for each of the plurality of users associated with the identifiers of the respective users, the reverse characteristic preference score manager for associating a contribution value with each indication of requests in the plurality, in proportion to a metric indicated by the type of the action corresponding to said request and, for each of at least some of the indications of the requests, for each of the plurality of indications of the characteristic values received from the user from whom the corresponding request was received, assigning, to each of the values of the characteristics of the user from which said request was received, the contribution value associated with said request, for summing the contribution values assigned to each value of each characteristic across all of the requests to produce a sum for each value of each characteristic, and for providing at an output the sum for each value of each characteristic in the plurality; and a user preference display manager having an input coupled to the reverse characteristic preference score manager output for receiving the sum for each value of each characteristic, the user preference display manager for selecting at least one of a highest sum for each characteristic value, and for providing via the TCP/IP-compatible communication interface coupled to an output at least one English language statement to the primary user describing the at least one of the selected highest sums for at least one characteristic value as a characteristic of users in the plurality who are interested in the primary user.

8. The system of claim 7, wherein, for a given user, no more than one request contributes to the sum for each characteristic value provided at the reverse characteristic preference score manager output.

9. The system of claim 8, wherein, for the given user, only a request corresponding to a highest contribution value contributes to the sum for each characteristic value provided at the reverse characteristic preference score manager output.

10. The system of claim 7, wherein:

the activity manager provides the indication of each request at the activity manager output additionally associated with a time stamp corresponding to a time it received said request;

the reverse characteristic preference score manager input is additionally for receiving the time stamp; and the reverse characteristic preference score manager assigns the contribution value to at least one value of at least one characteristic for a user in the plurality, responsive to whether said at least one value of at least one characteristic for the user was in effect at a time the request was received from said user.

11. The system of claim 7, wherein:

the user preference display manager provides the statement as part of a first website;

the characteristic/subject/preference manager input is coupled to a second web site, different from the first web site, for receiving at least one of the plurality of values; and at least one of the plurality of characteristic values received by the characteristic/subject/preference manager from the second web site is used by the reverse characteristic preference score manager to compute at least one of the plurality of sums provided at the reverse characteristic preference score manager output.

12. The system of claim 7, wherein the user preference display manager is additionally for:

selecting at least one of a lowest sums for each characteristic value in the plurality; and providing at the user preference display manager output, at least one additional English language statement to the primary user describing the selected at least one of the lowest sums for each characteristic value as representative of at least one of the plurality of characteristics of users in the plurality who are disinterested in the primary user.

13. A computer program product comprising a non-transitory computer readable medium having computer readable program code embodied therein for reporting characteristics about a plurality of actions taken with respect to a primary user, and configured to cause a computer system to:

receive and store into a non-transitory storage an indication of one of a plurality of values for each of a plurality of characteristics, each of the plurality of values representing possible characteristic values, from each of a plurality of users who take at least one of the plurality of actions with respect to a primary user;

receive via a TCP/IP-compatible communication interface an electronic request corresponding to each of the plurality of the actions of the plurality of users to be taken towards the primary user, each action in the plurality having one of a plurality of types, each type in the plurality indicating one of a plurality of different levels of interest in the primary user by said user making the request corresponding to said action, wherein each type in the plurality of types is represented by at least one of the actions in the plurality of actions;

store into the non-transitory storage an indication of each request, associated with an identifier of the user in the plurality of users from whom the request was received and an identifier of the primary user;

fulfill each request using the TCP/IP-compatible communication interface;

associate a contribution value with each indication of requests in the plurality, in proportion to an estimated metric indicated by the type of the action corresponding to said request;

for each of at least some of the indications of the requests stored into the non-transitory storage, for each of the plurality of indications of the characteristic values received from the user in the plurality from whom said request was received, assign to each of the values of each of the characteristics of the user from which the corresponding request was received, the contribution value associated with said request;

sum the contribution values assigned to each value of each characteristic across all of the requests to produce a sum for each characteristic value in the plurality;

select at least one of a highest sum for each characteristic value; and provide via the TCP/IP-compatible communication interface at least one English language statement to the primary user describing at least one of the selected highest sums for at least one characteristic value as a characteristic of users in the plurality who are interested in the primary user.

14. The computer program product of claim 13, wherein, for a given user in the plurality of users, no more than one request contributes to the sum for each characteristic value.

15. The computer program product of claim 14, wherein, for the given user in the plurality of users, only a request corresponding to a highest contribution value contributes to the sum for each characteristic value.

16. The computer program product of claim 13, wherein the contribution value is assigned to at least one value of at least one characteristic for a user in the plurality of users responsive to whether said at least one value of at least one characteristic for the user was in effect at a time a corresponding request was received from said user.

17. The computer program product of claim 13, wherein:
the providing is performed for a first website; and
at least one of the plurality of characteristic values used to compute at least one of the plurality of sums is received from a second web site, different from the first web site.

18. The computer program product of claim 13, additionally comprising non-transitory computer readable program code devices configured to cause the computer system to:
select at least one of a lowest sums for each characteristic value in the plurality; and
provide at least one additional English language statement to the primary user describing the selected at least one of the lowest sums for each characteristic value as a characteristic of users in the plurality who are disinterested in the primary user.

* * * * *